United States Patent
Bruennert et al.

(10) Patent No.: US 8,041,865 B2
(45) Date of Patent: Oct. 18, 2011

(54) BUS TERMINATION SYSTEM AND METHOD

(75) Inventors: Michael Bruennert, Munich (DE);
Peter Gregorius, Munich (DE); Georg Braun, Holzkirchen (DE); Andreas Gaertner, Munich (DE); Hermann Ruckerbauer, Moos (DE); George Alexander, Durham, NC (US);
Johannes Stecker, Munich (DE)

(73) Assignee: Qimonda AG, München (DE)

( * ) Notice: Subject to any disclaimer, the term of this patent is extended or adjusted under 35 U.S.C. 154(b) by 141 days.

(21) Appl. No.: 12/185,472

(22) Filed: Aug. 4, 2008

(65) Prior Publication Data
US 2010/0030934 A1    Feb. 4, 2010

(51) Int. Cl.
*G06F 13/00* (2006.01)
*H03K 17/16* (2006.01)

(52) U.S. Cl. .......................................... 710/104; 326/30

(58) Field of Classification Search .............. 710/5, 104, 710/105, 300, 110; 711/154; 326/30
See application file for complete search history.

(56) References Cited

U.S. PATENT DOCUMENTS

| | | | |
|---|---|---|---|
| 5,467,455 A * | 11/1995 | Gay et al. ....................... | 710/100 |
| 6,356,106 B1 * | 3/2002 | Greeff et al. .................... | 326/30 |
| 6,538,951 B1 * | 3/2003 | Janzen et al. ............. | 365/230.03 |
| 6,642,740 B2 * | 11/2003 | Kim et al. ....................... | 326/30 |
| 6,762,620 B2 * | 7/2004 | Jang et al. ....................... | 326/30 |
| 6,834,014 B2 * | 12/2004 | Yoo et al. ................. | 365/230.06 |
| 6,922,076 B2 * | 7/2005 | Braceras et al. ................ | 326/30 |
| 7,020,818 B2 | 3/2006 | Dour et al. | |
| 7,157,932 B2 * | 1/2007 | El-Kik et al. ................... | 326/32 |
| 7,414,426 B2 * | 8/2008 | Cox et al. ........................ | 326/30 |
| 7,433,992 B2 * | 10/2008 | Bains ................................ | 711/5 |
| 7,516,281 B2 * | 4/2009 | LaBerge ....................... | 711/154 |
| 7,554,353 B2 * | 6/2009 | Lee et al. ........................ | 326/30 |
| 7,602,209 B2 * | 10/2009 | Oh et al. ......................... | 326/30 |
| 7,616,473 B2 * | 11/2009 | Kyung .......................... | 365/148 |
| 2003/0039151 A1 * | 2/2003 | Matsui .......................... | 365/195 |
| 2003/0126338 A1 * | 7/2003 | Dodd et al. .................... | 710/305 |
| 2003/0234664 A1 * | 12/2003 | Yamagata ....................... | 326/30 |
| 2004/0098528 A1 * | 5/2004 | Janzen .......................... | 710/305 |
| 2007/0035326 A1 * | 2/2007 | Braun et al. .................... | 326/30 |
| 2009/0230989 A1 * | 9/2009 | Murayama et al. ............. | 326/26 |
| 2009/0273960 A1 * | 11/2009 | Kim et al. ....................... | 365/51 |

OTHER PUBLICATIONS

"On Die Termination (ODT) Calibration," Rambus, 2008, 8 pages.
"On-Die Termination," Wikipedia, the Free Encyclopedia, 3 pages, http://en.wikipedia.org/wiki/On-die_termination.
"DDR2 Application Note ODT(On Die Termination) Control," Samsung Electronics Co. Ltd., Mar. 2006, 12 pages.
"New Function of DDR2 SDRAM On Die Termination (ODT)," Technical Note, Elpida Memory Inc., Jan. 2005, 12 pages.
"Proper Termination for High-Speed Digital I/O Applications," NI Developer Zone, National Instruments, Sep. 6, 2006, 4 pages.

* cited by examiner

*Primary Examiner* — Mark Rinehart
*Assistant Examiner* — Trisha Vu
(74) *Attorney, Agent, or Firm* — Cozen O'Connor (57) ABSTRACT

A memory system includes a number of integrated circuit chips coupled to a bus. Each of the integrated circuit chips has an input/output node coupled to the bus, the input/output node having a programmable on-die termination resistor. The input/output node of one of the integrated circuit chips is accessed via the bus. The programmable on-die termination resistor of each of the integrated circuit chips is independently set to a termination resistance. The termination resistance is determined by a transaction type and which of the plurality memory devices is being accessed, which information can be transmitted over a separate transmission control bus.

66 Claims, 8 Drawing Sheets

BUS TERMINATION SYSTEM AND METHOD

TECHNICAL FIELD

This invention relates generally to electronics and, in particular embodiments, to a bus termination system and method.

BACKGROUND

Semiconductor devices are used for integrated circuits in a variety of electrical and electronic applications, such as computers, cellular telephones, radios, and televisions. One particular type of semiconductor device is a semiconductor storage device, such as a random access memory (RAM) device. Many RAM devices include many storage cells arranged in a two-dimensional array with two sets of select lines, wordlines and bitlines. An individual storage cell is selected by activating its wordline and its bitline. RAM devices are considered "random access" because any memory cell in an array can be accessed directly if the row and column that intersect at that cell are known.

A commonly used form of RAM is known as a dynamic RAM (DRAM) device. Dynamic random access memory has memory cells with a paired transistor and capacitor, wherein the capacitor requires periodic refreshing. One particular type of DRAM device is a synchronous DRAM (SDRAM) device, in which the memory cells are accessed synchronously. Synchronous dynamic random access memory often takes advantage of the burst mode concept to greatly improve performance by staying on the row containing the requested bit and moving rapidly through the columns. To achieve a high speed operation, a double data rate (DDR) architecture is often used, during which two data transfers are made per clock cycle, one upon the rising edge of the clock and the other upon the falling edge.

Normally multiple DRAMs are connected in parallel to the data lines to achieve high memory capacity with low cost. One issue that arises with high speed operation is the need to properly terminate bus lines. Each chip along a bus line will cause an impedance discontinuity, which can cause reflections and other noise such as distortion and ringing. To minimize these affects, the bus will be terminated with a resistor, with the goal of having uniform impedance along the line. A technique known as on-die termination (ODT) can be used to terminate the bus on the chip itself rather than on the circuit board.

Although the termination resistors on the circuit board reduce some reflections on the signal lines, they are unable to prevent reflections resulting from the stub lines that connect to the chips. A signal propagating from the controller to the components encounters an impedance discontinuity at each stub leading to the chips on the module. As a result, a reflection will be generated at each stub independent of the termination setting. It is desired, however, to minimize the impact of these reflections.

SUMMARY OF THE INVENTION

In one embodiment, a system includes a number of integrated circuit chips coupled to a bus. Each of the integrated circuit chips has an input/output node coupled to the bus, the input/output node having a programmable on-die termination resistor. When the input/output node of one of the integrated circuit chips is accessed via the bus, the programmable on-die termination resistor of each of the integrated circuit chips can be independently set to a termination resistance. The termination resistance is determined by a transaction type and which of the plurality memory devices is being accessed.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a dynamic random access memory module. The invention may also be applied, however, to other electronic systems that include more than one chip coupled to a bus. For example, other memory systems such as static random access memory, flash memory and other non-volatile memories (e.g., NROM, SONOS, PCRAM, MRAM and others), can utilize aspects of the present invention. In addition, non-memory systems such as control systems, processing systems and others can use the aspects of the present invention.

Figure 1:
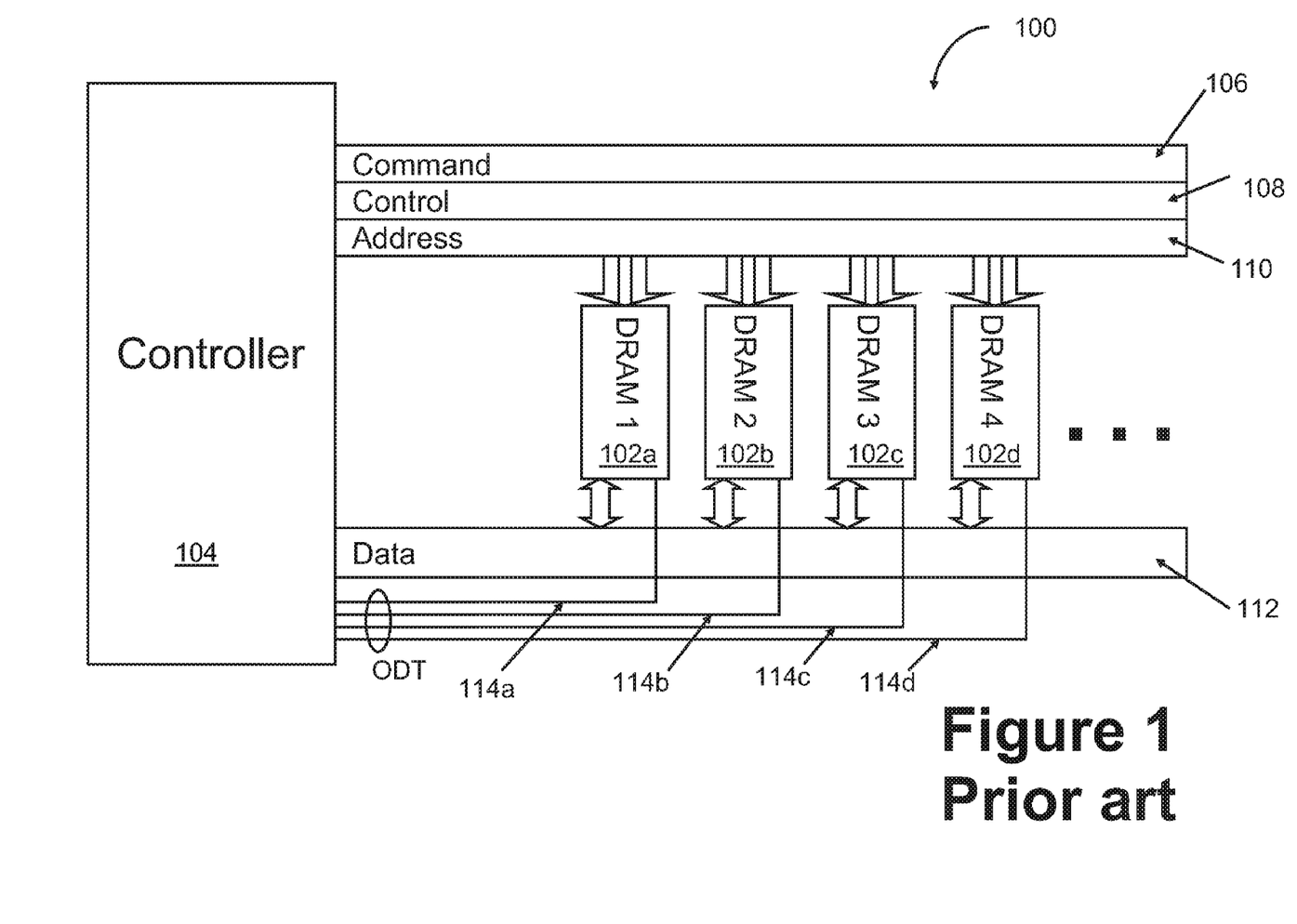
FIG. 1 is a block diagram of a conventional memory system.

On-die termination (ODT) schemes are known. For example, the DDR2 standard promulgated by JEDEC includes ODT. FIG. 1 provides a simplified diagram of one such system. In this example, four memory chips 102a-102d are connected to a controller 104 by, among other things a series of busses. These busses include command bus 106, control bus 108, address bus 110 and data bus 112.

In DDR2 memory systems, each memory chip 102a-102d on the memory bus has a separate ODT signal 114a-114d as shown in FIG. 1. If this signal is active, the bus participant terminates with a predetermined value, which may be programmable. If it is inactive, the participant lets the I/O pins float.

This scheme is relatively inflexible, since the only option for each bus participant is to terminate or to let the pin float.

The only means to optimize the signal integrity on the bus is to change the number and position of terminating participants for all possible transmission scenarios. Since every bus participant can transmit or receive data or the bus can be idle, there are nine such combinations for a four participant bus as shown.

With the increasing data rates of DDR3, a dynamic termination scheme was introduced. Basically each memory chip has two termination values, which can be independently programmed. One termination value is used while the memory chip is receiving data. This is controlled by the write command used to make the memory chip receive the data. The other termination value is used the rest of the time, i.e., a neighboring memory chip is receiving or transmitting data. It is controlled by the ODT signal like in the DDR2 system.

This termination scheme offers more control for a memory chip receiving data with a very moderate extension of the complexity compared to the previous generation and sufficient performance increase for the DDR3 memory system application. This scheme does not, however, offer any possibility for fine grained control of the inactive participants of the bus system. Furthermore the dynamic ODT approach mixes termination control functionality and data transmission control. In other words, if the data transmission control indicates that a certain transaction (e.g., transmission to a memory chip) is ongoing, a specific termination impedance is set. This means that the data transmission control of the memory chip must run continuously for controlling the termination, even if it could be disabled otherwise, i.e., due to the memory chip being in power down. The termination control has to run continuously to support active neighbor chips transmitting their data over the bus.

As the data rates of such bus systems increase, these coarse grained termination control schemes are inadequate to achieve sufficient signal integrity on the bus. Especially in highly asymmetric low cost memory busses with a varying number of participants, the optimal termination impedance for each bus participant may be different for each possible transmission mode (transmission/reception on every participant).

At any given time, the bus system can be in a limited number of states. In a typical memory subsystem, where a controller reads and writes data from four DRAMs (called rank) connected to one memory channel, the memory channel can be in an idle state, if no transaction is ongoing, writing to ranks 1-4 or reading from ranks 1-4. This totals nine different memory bus transmission states. Each of these states may have its own distinct set of termination impedance values for the controller and the four DRAMs. In a DRAM system, the controller knows the bus state all the time, since it controls the bus. Similarly, a memory system with two ranks would have five states and a memory system with eight ranks would have seventeen states. In other words, the concept can be extended to any number of participants on the bus.

Embodiments of the invention can utilize at least two concepts. In a first aspect, all possible transmission modes of a bidirectional multidrop bus channel can be encoded into a binary number and distributed to all bus participants via a transmission control bus. This transmission control bus can be used for purposes such as termination control. The bus can also be used for other purposes. Alternatively, or in addition, a bus snooping technique can be used to get the bus state information. In a second aspect, each bus participant can have its own mapping circuit for converting the channel transmission mode received from the transmission control bus into a termination impedance value. A discussion of systems that use these concepts and others will now be provided.

Figure 2:
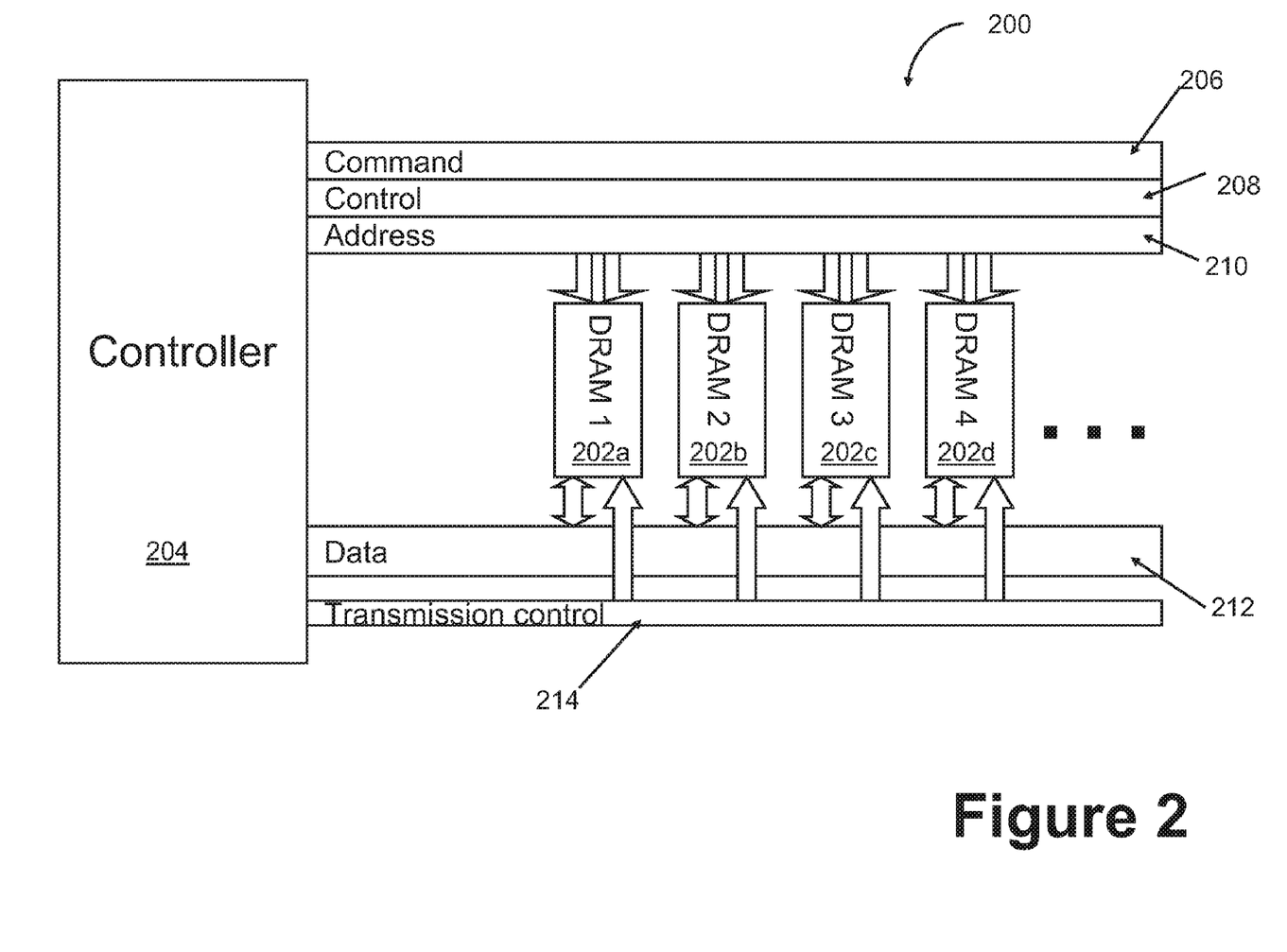
FIG. 2 is a block diagram of an embodiment memory system of the present invention.

FIG. 2 shows a first embodiment system 200. A memory system includes memory chips 202a-202d, collectively 202, which are each attached to one or more circuit boards (not explicitly shown). Each circuit board would create a DIMM. For example, a memory system has a motherboard with a set of DIMM sockets, some of which might or might not house a DIMM. The memory chips 202a-202d can be distributed over an arbitrary number of DIMMs. A typical DIMM might have a data bus that is 72 bits wide while each DRAM has an I/O width of 4 bits. As a result, 18 DRAMs are used to cover the 72 Bits. This group of DRAMs is referred to as a rank, since they are all receiving their commands/addresses/controls in parallel. The system of FIG. 2 shows four 4 ranks, which can be split over, e.g., one, two or four DIMMs with four, two, or one rank per DIMM, respectively. In the figure a single chip 202 is illustrated to represent all chips in the rank. Other system configurations, which could gain advantage from embodiments of the invention, will include 2, 6 and 8 ranks as well.

In a manner similar to that of the system of FIG. 1, the memory chips 202 are coupled to a controller 204 by command bus 206, control bus 208, address bus 210 and data bus 212, which are all typically provided as metal traces in or on the circuit board. Each rank of the memory chips 202 has a number of data input/output nodes, e.g., equal to the word length of the bus, coupled to the data bus. Each data input/output node is coupled to a programmable termination resistance, which will be discussed in greater detail below. The resistance for each of the programmable termination resistances is determined independently for each chip in a set of memory chips 202. For example, the resistance of each programmable termination resistance can be determined based on a transaction type and which of the memory chips 202a-202d is communicating with the data bus 212. Other types of information, such as DIMM type and/or position on the bus, could additionally or alternatively be issued to determine the programmable termination resistance.

Figure 3:
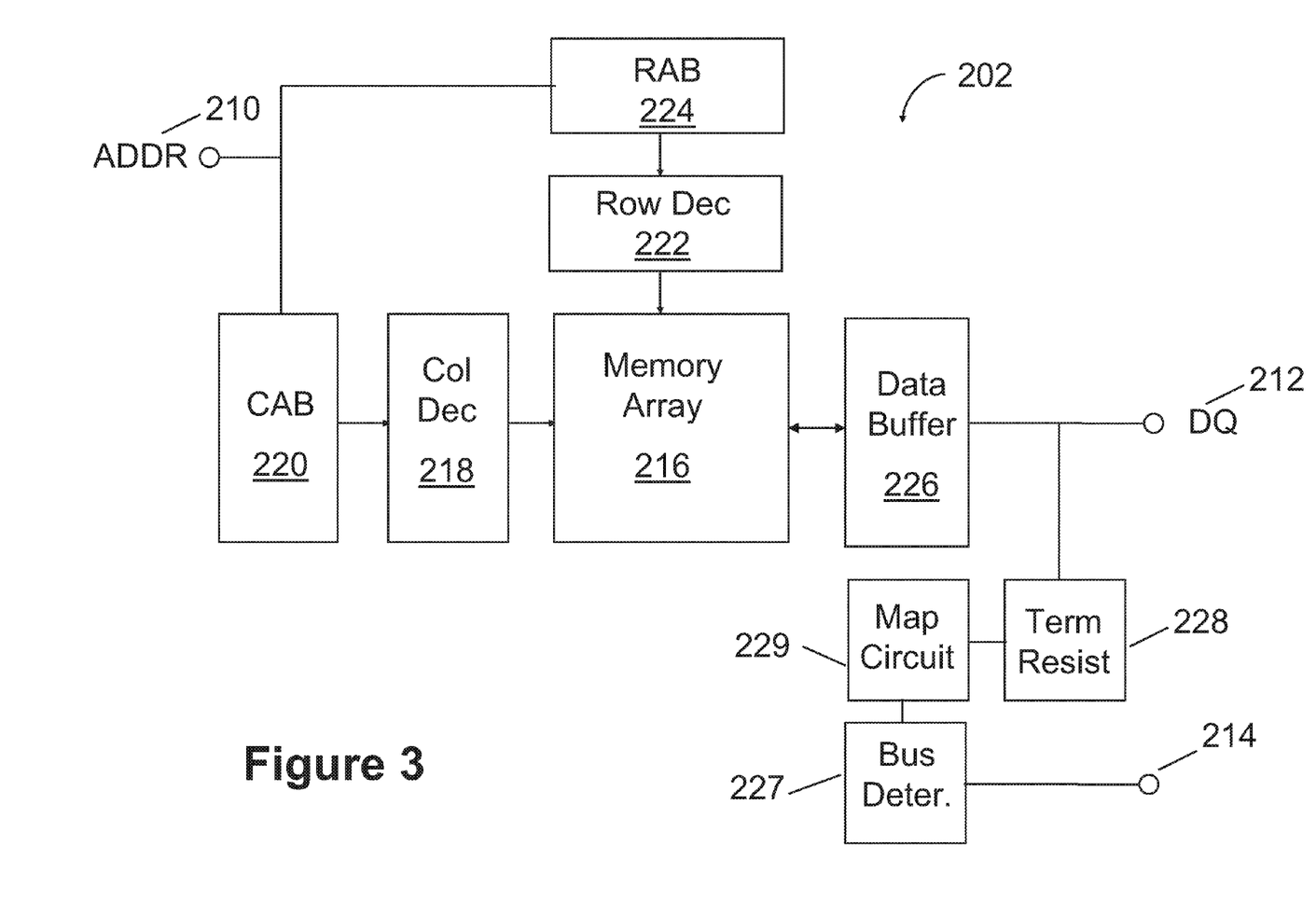
FIG. 3 is a block diagram of an embodiment memory device of the present invention.

FIG. 3 illustrates a functional block diagram of each of the memory chips, which are preferably but not necessarily identical. As noted above, each rank of memory chips 202 will typically include a number of chips. While this figure illustrates one configuration for a memory, other configurations could also be used. The memory device includes an array of memory cells, such as DRAM cells. In other cases, other types of memory can be utilized. To access a particular cell in the array 216, an address selection signal ADDR is transmitted to a Column Address Buffer (CAB) 220 and Row Address Buffer (RAB) 224. In a typical DRAM chip, the column address and row address share external pins so that the row address is received at a first time and the column address is received at a second time. The ADDR signals may be transmitted by an external device, such as memory controller 204, for example.

The column address buffer 220 and row address buffer 224 are adapted to buffer the address signal ADDR. The outputs of the column address buffer 220 and row address buffer 224 are coupled to a column decoder 218 and row decoder 222, respectively. The column and row decoders 218 and 222 are adapted to decode the signals received from the column address buffer 220 and row address buffer 224, respectively, to provide the signal input to the array 216, such that the selected row and column can be selected.

In FIG. 3, the column and row decoders 218 and 222 are shown as single blocks. It should be understood, however, that the column and row decoders 218 and 222 may carry out several levels of predecoding and decoding. Some or all (or none) of these levels may be clocked.

Data DQ that is addressed in array 216 will be written into the memory or read from the memory via data buffer 226. Once again, this portion of FIG. 3 is simplified. The data buffer 226 and associated line are provided to represent the read and write path, which may include a large number of lines and other components (e.g., secondary sense amplifiers).

A programmable termination resistor block 228 is coupled to the data input/output node DQ. In most applications, multiple data input/output lines, e.g., four, eight or sixteen, will be included and each will have its own termination resistor. As will be discussed below, the termination resistance can be determined by a transaction type (e.g., read or write) and which of the memory devices 202a-202d is involved in the transaction.

Figure 4:
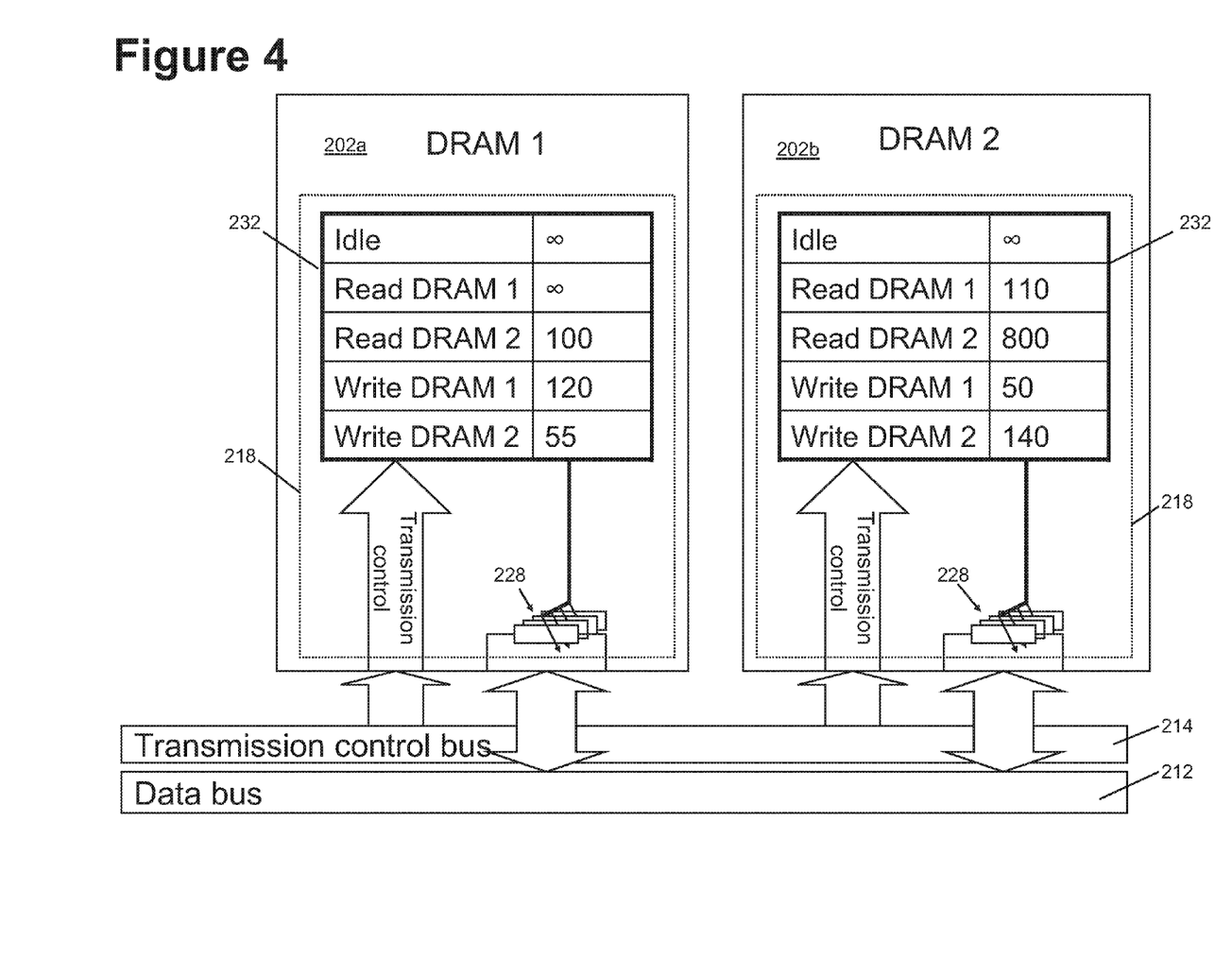
FIG. 4 is block diagram showing a first embodiment of the invention.
Figure 5:
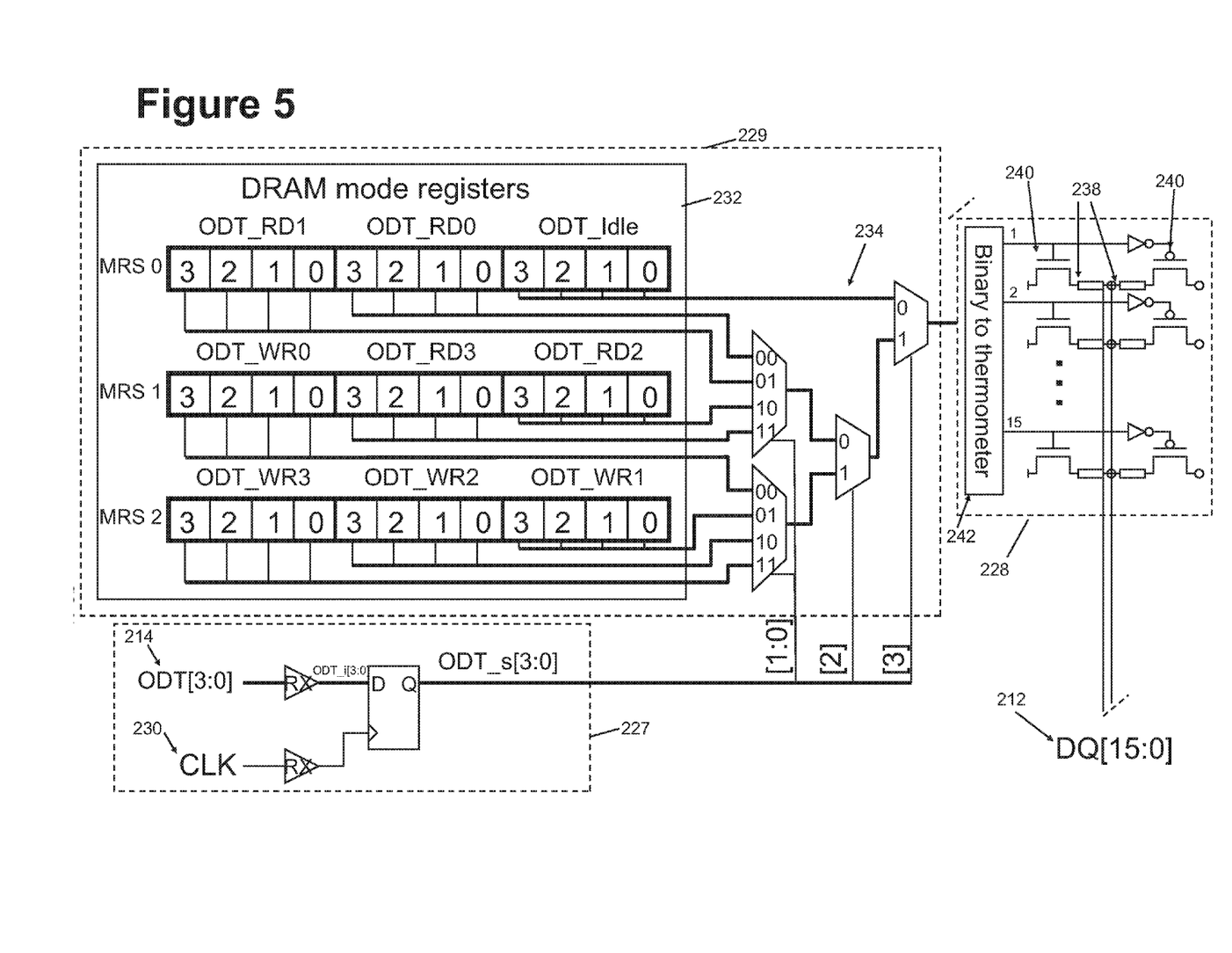
FIG. 5 is a block diagram showing one specific implementation.

In one example discussed in FIGS. 4 and 5, the programmable termination resistor 228 is set to a termination resistance based on a value stored in the look-up table (element 232 in FIG. 4). In the more general case, the programmable termination resistor 228 is set by a termination resistance mapping circuit 229, which will calculate the actual termination setting. The circuit 229 can be a programmable table, a set of predetermined tables, a mathematical function or any other circuit to determine the desired resistance value.

The resistance value determined by the mapping circuit 229 can be based on information received from the bus state determination unit 227. As illustrated in the figure, the determination unit 227 is coupled to the ODT bus 214. While the unit 227 can be a simple receiver coupled to the ODT bus, it could also be a bus snooping unit. For example, in embodiments that do not include an ODT bus, the bus state determination unit could be coupled to an address, command and/or control bus.

Returning now to FIG. 2, the termination resistance value can be obtained from a transmission control bus 214. The resistance for each of the programmable termination resistances is determined based upon information received from the transmission control bus 214. For example, the finite set of states can be coded and transmitted on a binary transmission control bus 214 that is coupled to all bus participants 202. In the example given above, a 4-bit bus would be sufficient to communicate the complete bus state. This 4 bit bus could be formed out of the four ODT signals (one for each DRAM), which have been previously used to control the termination impedance (see control lines 114 in FIG. 1). In this example, the total required number of signals for the bus 214 would not increase compared to existing solutions. Only each bus participant's number of inputs would increase, since one ODT signal would be replaced with the 4-bit transmission state control bus 214.

Each bus participant 202 will convert the bus state into a concrete value for the termination impedance. One method to do this is a lookup table. For each possible bus state encoded by the bus state control bus 214, a termination impedance value is stored in the table. Each participant on the bus has a different table with optimum values for this particular point on the bus.

In one aspect, all possible transmissions modes of a bidirectional multidrop bus channel can be encoded into a binary number and distributed to all bus participants via a transmission control bus 214. This embodiment has been discussed with respect to FIG. 2. As discussed above, the controller 204 is connected to a set of DRAMs, e.g., four ranks of chips in the figure, via a set of busses: unidirectional command, address and control busses 206, 208 and 210 used to send commands to the DRAMs 202 and a bidirectional data bus 212 used to transfer data from and to the DRAMs 202. Each DRAM 202 has the capability to read and write data from/to the bidirectional data bus 212.

As data rates increase, portions of the signal will be reflected back to the bus 212 at every DRAM 202. This will reduce the available signal quality. Depending on the type of transaction, the reflections can be different. For example, if the controller 204 is transmitting data, there can be reflections on all four DRAMs, which will arrive at a certain DRAM in a relatively short period of time due to the short bus lengths between the DRAMS. If one of the DRAMs is transmitting data, there are three other DRAMs and the controller 204 to provide reflections, causing a different pattern of disturbance at the receiver.

These reflections can be reduced but not completely eliminated by electrical termination with a resistor on every DRAM 202. Since it is not possible to completely cancel the reflections, the reflections must be optimized (by adapting the value of the termination resistor) to sum up to the least possible disturbance at the particular receiver. In other words, while individual reflections can be brought close to zero, there are times when a nonzero reflection may be more optimal for the whole system, since it might at least partially cancel other reflections, e.g., the stub reflections. This optimum is different for each transmission scenario (read/write to each individual DRAM).

In a DRAM system 200, the controller 204 knows at any time, which transmission mode the bus is in. In current DRAM memory systems, however, each DRAM does not know the exact bus state since it is only connected to a portion of the control bus. Since the DRAMs need to know the transmission mode to choose the correct termination impedance, the transmission mode needs to be communicated from the controller to the DRAMs. This is done with the transmission control bus 214 in FIG. 2, which connects all DRAMs 202 with the controller 204 like the command and address busses.

The coding on this bus can be determined by system needs. A binary encoding allows the minimum number of data lines for the bus. The relation between the binary numbers and the transmission mode can be chosen to minimize decoding complexity and toggling on the bus. Non binary schemes might be feasible as well, if a higher number of data lines for the transmission mode can be traded against lower decoding complexity or power consumption. One possible mapping for the 4 DRAM bus is given in the following table:

| Data bus state | Coding |
| --- | --- |
| Idle | 0xxx |
| Read DRAM 1 | 1000 |
| Read DRAM 2 | 1001 |
| Read DRAM 3 | 1010 |
| Read DRAM 4 | 1011 |
| Write DRAM 1 | 1100 |
| Write DRAM 2 | 1101 |
| Write DRAM 3 | 1110 |
| Write DRAM 4 | 1111 |

The most significant bit encodes, if there is activity (1) on the data bus. If there is no activity (0), all other bits are don't care (x). The second most significant bit encodes, if there is a read (0) or a write (1) ongoing. And the two LSBs encode in a binary number, which of the four DRAMs is reading/writing.

Within each DRAM 202 the information about the bus transmission mode delivered by the transmission control bus 214 needs to be translated into concrete values for the termination resistor value. One embodiment approach is depicted in FIG. 4. Each DRAM 202 contains a programmable table 232 with entries for all possible transmission modes. Each entry contains a value for the termination resistor setting. As shown in FIG. 4, the settings in the tables 232 of different DRAMs 202 will be different.

If the transmission control input of the DRAM indicates a new transmission mode, the table 232 is looked up for this mode, information related to the termination resistor value is read out of the table 232 and applied to the termination circuit 228.

In a circuit implementation the lookup table 232 can realized as a register file or SRAM, which is addressed by the encoded value of the transmission control bus. The system would include some means to write this register file or SRAM by configuration commands from the controller 204 to the DRAMs 202 during system initialization. Each DRAM 202a-202d can be addressed separately for these configuration commands to allow writing different tables into each DRAM.

FIG. 5 illustrates one possible implementation of the bus state determination circuit 227, the mapping circuit 229 and the programmable termination resistor 228. In this embodiment, the lookup table 232 is stored in a plurality of DRAM mode registers. As noted above, a four rank system will have nine different memory bus transmission states. If the resolution of the resistance values is limited to four bits (i.e., 16 levels), the look up table 232 can be implemented with three 12-bit registers. Of course, in other embodiments, other register configurations and resolutions can be used. The specific circuit of FIG. 5 is provided only as an example.

The contents for the desired look-up table entry 232 are selected using selection circuitry 234, which in this example is formed from four multiplexers. This particular example corresponds with the embodiment described with respect to the table above. Any selection circuitry, however, could be used for this task. The contents of the look up table entry are then provided to the programmable termination resistor 228. In this example, four bits are provided to a binary-to-thermometer converter 242, which outputs fifteen bits. The input value read as a binary number denotes the number of active termination fingers. Accordingly, each of the fifteen bits is coupled to select (or not select) a corresponding resistor (or resistor pair) 238 via selection transistor(s) 240. In this manner, the combination of the individual resistors 238 form a programmable resistor 228.

In one embodiment, each of the resistors 238 can have the same value R. In this case, the total resistance will scale from no termination (near infinity), to R, R/2, R/3, etc. In other embodiments, the resistors may have different values. As such, the circuit can be designed to provide any fifteen (or sixteen if there is no "no termination" setting) resistance values. In another embodiment, the binary-to-thermometer converter can be avoided and the resistors can selected or not selected independently. Once again, a four bit code would provide sixteen possible resistance values. Alternatively, other numbers of bits can be used. For example, a five-bit code would provide 32 possible resistor values. This modification significantly increases the resolution at the cost of one additional bit for each lookup table entry and more complex decoding, whether using a binary-to-thermometer code or otherwise.

The example of FIG. 5 is used in a system with a sixteen bit data bus 212. In one embodiment, a single lookup table 232 provides the resistance information for sixteen different programmable termination resistors 228, each programmable termination resistor being coupled to an associated one of the data input/output nodes DQ[15:0]. In this embodiment, each of the DQ nodes would use the same termination resistance. In another embodiment, an individual lookup table is provided for each input/output node. In this manner, the termination resistance can further be tailored to the specific DQ line.

In one aspect, schemes described here allow for the optimization of the terminations of the bus signal integrity independently for all possible transmission modes. The granularity of values is determined by the resolution of the table entries and not by the system.

In a further aspect, schemes described here separate the termination control completely from the rest of the bus protocol, allowing power efficient implementations. In other words, a specific memory chip 202 in a low power state does not need to decode commands from the address/command/control busses.

Further embodiments of the principle allow the complexity of the approaches depicted in FIGS. 2 and 5 to be reduced.

In system configurations with a certain amount of symmetry or reduced signal integrity requirements, some restrictions can be made to the termination resistance values needed on each DRAM. In other words, the full set of transmission states and table entries for it can be reduced. For example, in a sufficiently symmetric configuration, it may be possible to split the 4-bit transmission control bus into two 2-bit busses connecting either half of the bus participants. Each of them then has to implement a four element rather than a nine element lookup table, which allows a less complex and power hungry implementation with fewer I/O pins on each participant. The reduction is possible due to uniting multiple states with sufficiently similar termination requirements into one. The cost of this simplification is that each participant can then only distinguish four transmission cases, where a sufficiently well performing mapping to the nine bus transmission states must exist.

Figure 6:
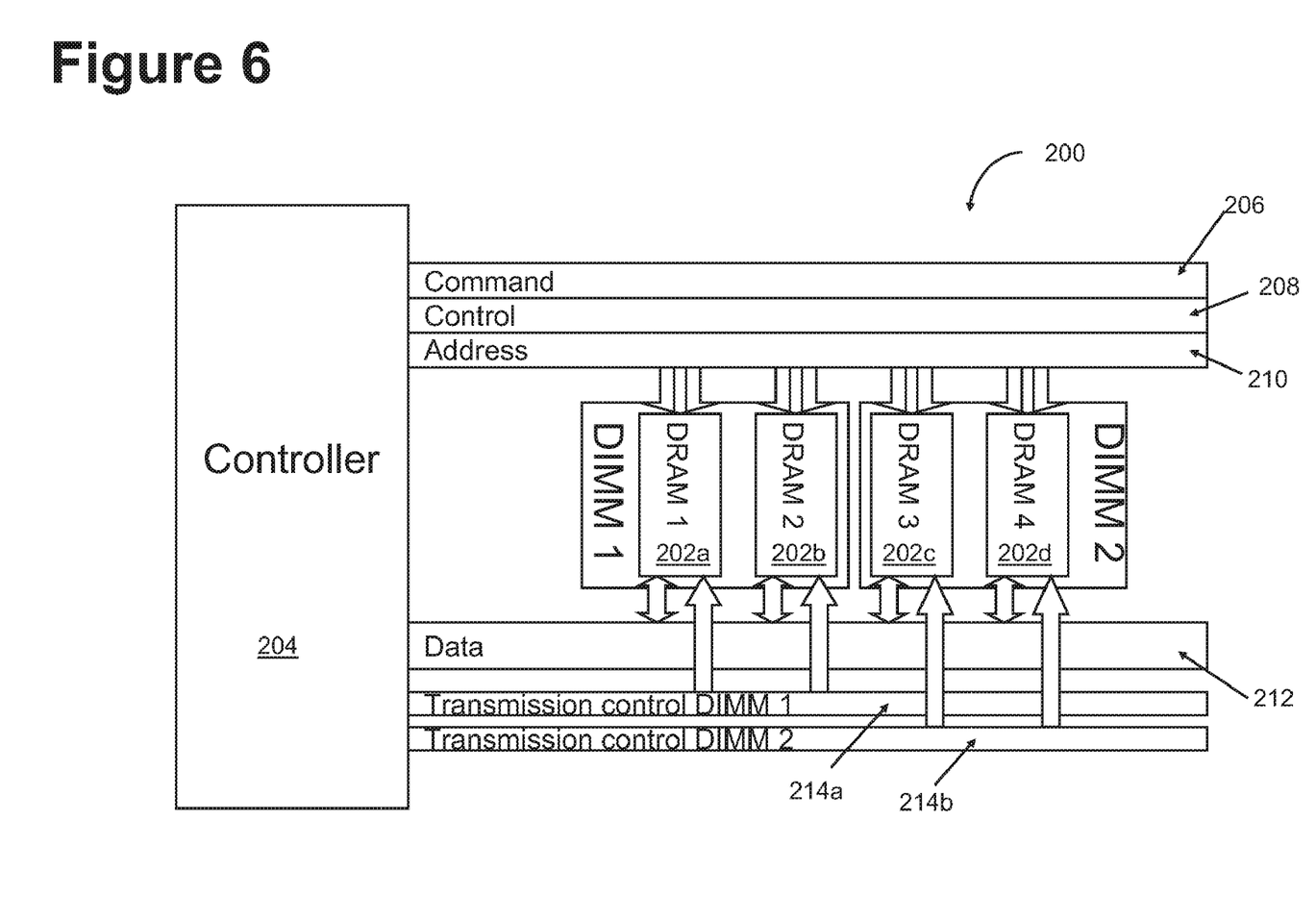
FIG. 6 is a block diagram of an embodiment memory device of the present invention.

For example, in the case depicted in FIG. 6, where two ranks of DRAMs 202a and 202b, or DRAMS 202c and 202d, reside on one DIMM, it may be possible to have the same configuration for both DRAMs on the DIMM, which is currently not in a read/write transaction. In this case, the channel transmission control bus can be split into two busses 214a and 214b, one for the two DRAMs 202a and 202b on DIMM 1 and one for the two DRAMs 202c and 202d on DIMM 2. Each of the two control busses 214a and 214b needs to encode fewer combinations and therefore has fewer signals. Even if the total number of bus lines doesn't decrease or even increases, the number of pins on each DRAM component and the complexity of the lookup tables in the components can be reduced.

An example coding for each of the two busses in a two DIMM case with two DRAM ranks per DIMM is given in the following table:

| Data Bus state | Coding |
| --- | --- |
| Idle | 00 |
| Write to any DRAM, Read to other DIMMs DRAMs | 01 |
| Read on DRAM 1 | 10 |
| Read on DRAM 2 | 11 |

This scheme would reduce the table within the DRAM from nine entries to four entries and the number of required transmission state pins on each DRAM from four pins to two pins. There is the restriction, that there is only one termination value for writes, which will be used for reads on the other DIMM as well.

Other encodings are possible and will be needed depending on the actual system restrictions.

The lookup table 232 is completely programmable in the most general case. In the case where performance requirements can be traded against implementation complexity, a number of reduction measures are possible. For example, a set of predetermined tables can be provided and then the device can be programmed to determine which table should be used. For example, a pre-programmed table can be selected depending on the position of the participant of the bus. For example, the participant closest to the controller uses the first table, the next closest participant uses the next table and so on.

Figure 7:
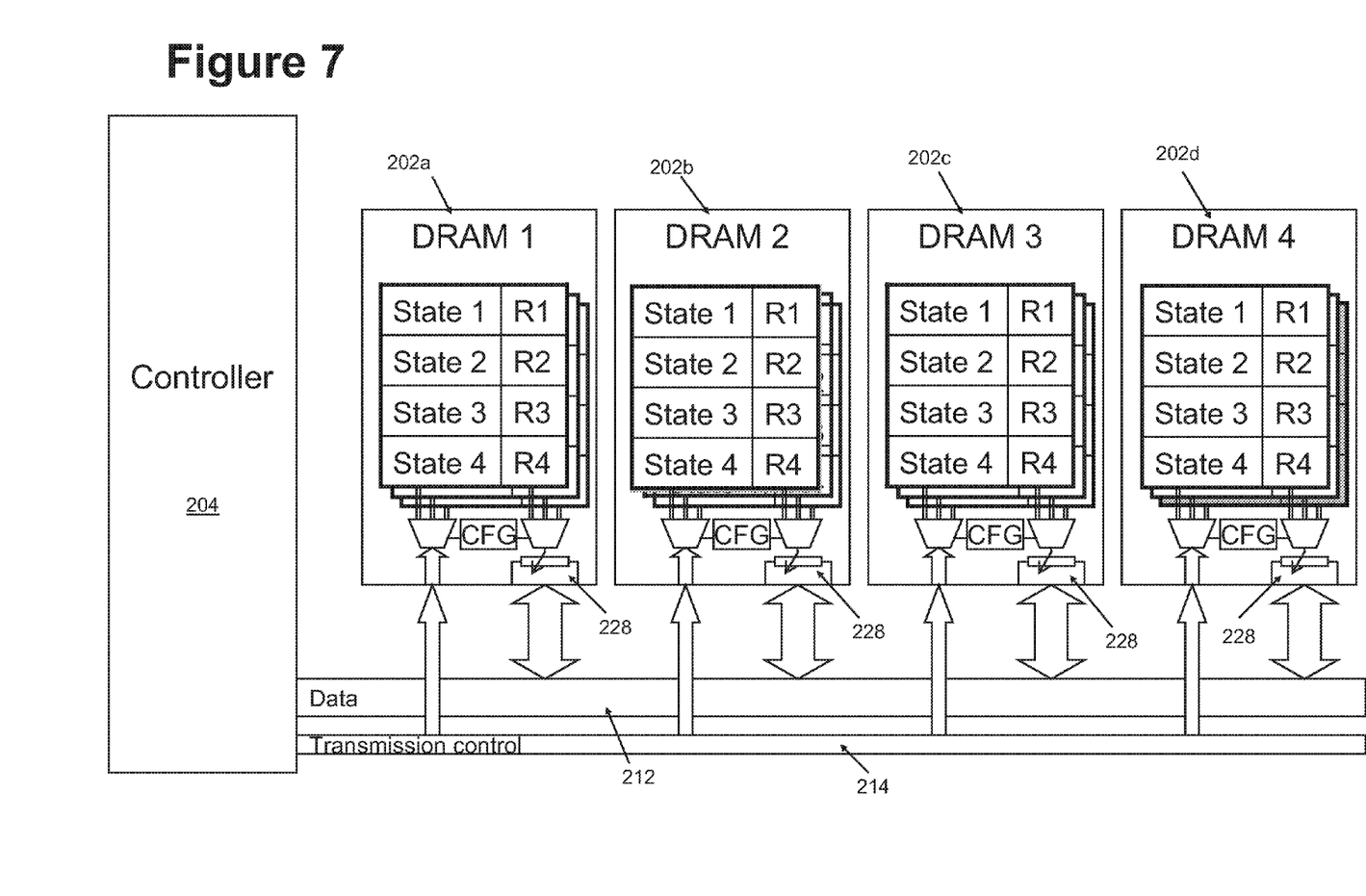
FIG. 7 is a block diagram of an embodiment memory device of the present invention.

Another embodiment of the invention is provided in FIG. 7. In this embodiment, different termination value tables are provided for each DRAM in a DRAM channel. If the channel is sufficiently well defined and the corresponding characteristics stable over process, voltage, temperature and life time of the system, the tables don't need to be updated during the lifetime of the system. They can be determined once and put into the DRAMs as a set of fixed tables, i.e., into small read only memories. Depending on the position of the DRAM in the channel, the controller would program a configuration register, which table out of the set of available tables to use for that DRAM. This would reduce the number of configuration bits from 9*4=36 (if every entry in the resistance table has 4 bits) to 3 bits for selecting one out of 8 tables. Furthermore hard coded tables might have a reduced implementation complexity.

The hard coded table could be programmed during the fabrication process or testing, i.e., before the chips are populated on the DIMM. In another embodiment, the hard coded tables are programmed after the DIMM is populated. For example, a test procedure can be performed on the DIMM and a one-time programmable ROM or eFuse can be programmed. To further simplify, each chip can include only a single look-up table since the position in the DIMM has already been determined. Another simplification technique would be to consolidate multiple similar entries into one entry.

In a further embodiment, the dependence of the termination values on the transmission state and some system parameters may be sufficiently deterministic to put it into a mathematical function. Then the table lookup process can be replaced by a circuit for evaluating this mathematical function of the transmission state input and some system parameters, which are set in configuration registers.

The optimal tables for each participant can be found by simulations or measurements of the particular configuration and statically stored in the system. For highest performance applications, the tables can be determined by a training algorithm during system power up or even with continuous (re-) training during system operation. For example, if the controller knows that the bus will be idle for a period of time, a training algorithm can be performed. In another example, training can be performed when the system determines that performance is lagging or when a physical characteristic such as temperature has changed.

In a further embodiment, the controller 204 implements a training algorithm for the termination impedances. This involves some kind of transmission quality monitor at each receiver in the controller 204 and the sets of DRAMs 202, a mechanism to communicate that quality information to the controller and a search algorithm. The controller would initialize the termination tables 232 of all DRAMs 202 to sensible start values. Then it performs transactions on the bus 212 and gets back the transmission quality. Then the values in the termination tables 232 are updated depending on some optimization algorithm (e.g., steepest gradient) and the transaction and quality monitoring procedure is repeated to check for improvements in the data transmission. Depending on the outcome of the measurement the values are modified again until an optimum of transmission quality is achieved. The training procedure can be executed if a new memory bus configuration is detected, on every system startup, and/or in regular intervals during system operation.

In a further embodiment, the transmission control bus 214 can be extended to a system control bus, which encodes important operation modes of the connected devices. In case of DRAM, this operation mode could be power down. For example, there are seven unused bit combinations for the transmission control bus in the four rank case. These unused bits could be used to indicate the power down mode of the DRAMs in a more detailed way than the existing DRAM power down protocols. Furthermore the independent signaling of power down with the separate system control bus allows a minimum power overhead for the power down signaling allowing a very low power system solution.

In a further embodiment, the transmission control bus information is used to control the command/address/control bus termination. In state of the art DRAM designs the command/address/control bus is statically terminated with a separate resistor at the end of each bus. Each DRAM does not have any termination, which is possibly due to the unidirectional broadcast bus type. This static approach ensures that every DRAM can receive all commands correctly at the expense of spending a lot of power for a low impedance termination and driver. Correct receiving of commands is necessary since any erroneous command leaves the system in an unknown state.

If each DRAM knows whether to receive or ignore the data on the command bus, the command bus could be optimized similar to the data bus. Each DRAM (or set of DRAMs) would have a local termination resistor and for each possible transmission mode (idle, command to every DRAM) an optimum termination resistor combination would be chosen to achieve the optimum signal quality at the DRAM, which is supposed to process the command. At inactive DRAMs the signal quality can be poor but since the signals are not evaluated no harm will come to the system. This approach would allow the required signal quality to be achieved with less power, since a smaller transmission amplitude is necessary to achieve the same receive data eye height. Only the transmission control bus would need to run in a configuration, which allows error free reception on every DRAM all time.

In a further embodiment, the bus determination unit 227 does not need to be a receiver for an ODT bus. For example, bus determination unit 227 can be a bus snooping unit that determines the transmission state. All traffic on the data bus 212 is controlled by the command, address and control busses 206-210. Thus these three busses contain the information about the data bus transmission state. In contrast to the separate transmission control bus 214 there is a considerable effort to get the actual data bus transmission state from the control/command bus 206-210 transaction, i.e., due to variable latencies from a command to a data transfer and a relatively complex encoding of the commands. Furthermore parts of the control bus 208 are not connected to every rank of DRAMs 202. But connecting the missing parts to every rank of DRAMs 202 and skipping the former ODT 114 and the transmission control bus 214 may still result in net pin count savings on the DRAM device. This pin count saving might be worth spending the more complex and power hungry command/control bus snooping to determine the termination impedance.

Regardless, how the transmission state is found in each DRAM, all described methods of determining a termination impedance setting for each transmission state can be applied.

Figure 8:
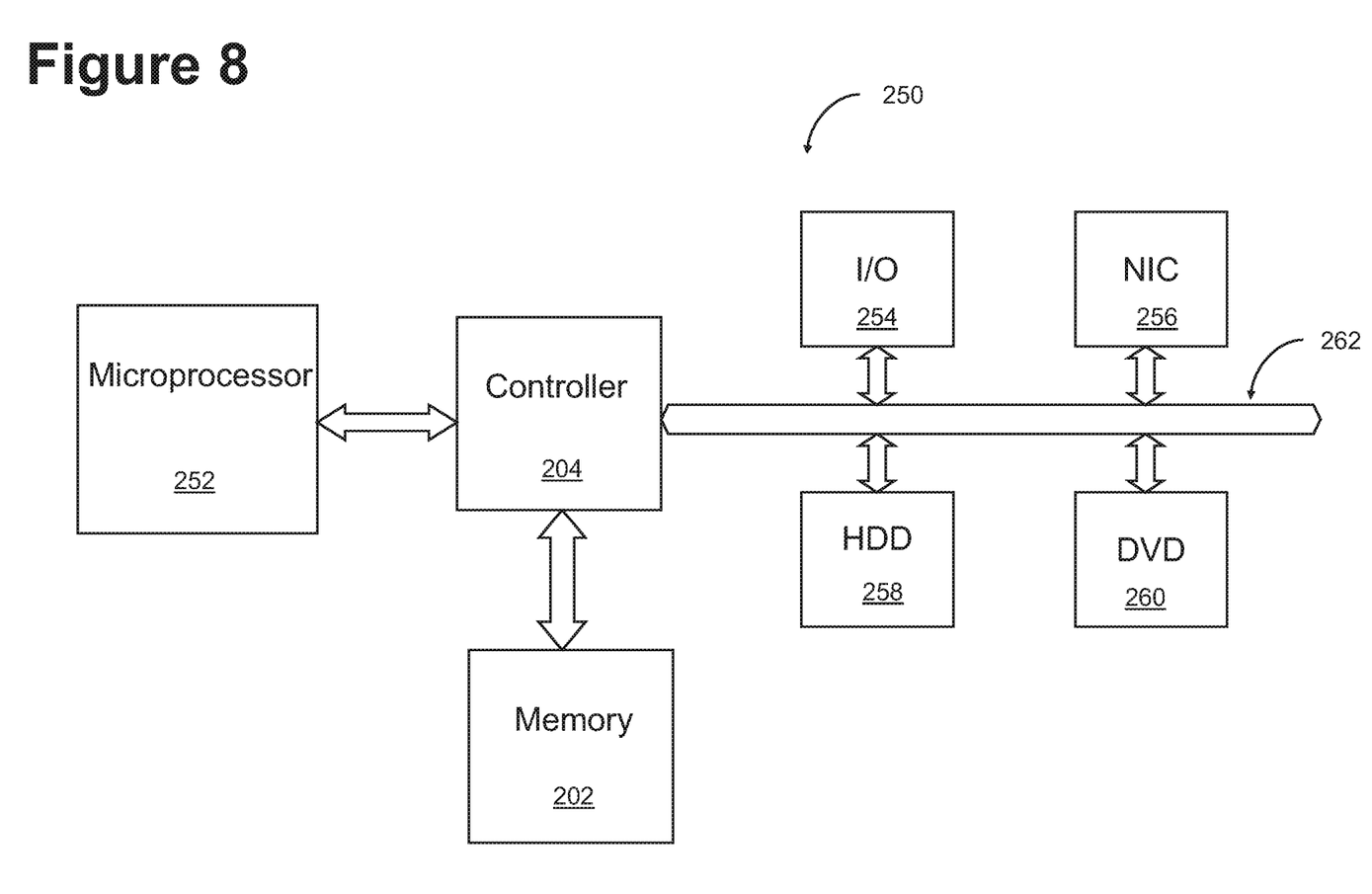
FIG. 8 is a block diagram of a computing system that can utilize aspects of the present invention.

As an example, one system that can use a memory system of the present invention is a computer system 250, an example of which is shown in FIG. 8. The computer system 250 includes a microprocessor 252 which is coupled to a controller 204. In this example, controller 204 serves the combined purpose of serving as a memory controller and also as a bus interface controller or bridge. In other systems, separate devices could be used for these tasks. The memory system 200 can be any of the memory systems described herein.

The bus 262 is coupled to a number of components and communicates with the microprocessor 252 via the controller 204. Four examples of components that can be coupled to the bus 262 are shown, i.e., user input/output 254 (which could include a display, mouse, keyboard, microphone or other), network interface card 256, hard disk drive 258 and DVD drive 260. These examples are provided only to show the types of devices that can be utilized in a computer system 250. Other busses or components could be used.

While the present invention has been discussed with respect to DRAM, it is understood that other memory systems could utilize these features. In fact, any communication system that includes more than two components, whether memory or not, coupled to a common signal line can find advantage in utilizing concepts of the present invention.

As an example, the bus 262 shown in FIG. 8 has a number of bus participants. This bus could utilize an on die termination approach as discussed herein. For example, each of the bus interface chips would include a control input, e.g. a transmission state control bus 214, for determining the state of the bus and a programmable resistor as discussed herein.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An electronic system comprising:
a bus;
a plurality of bus participants coupled to the bus, each bus participant including a variable termination impedance coupled to the bus;
wherein there are a number of possible transmission states between the bus participants and, for each possible transmission state, each bus participant independently sets its variable termination impedance to a termination impedance value, wherein all possible transmission states are encoded in a binary number,
wherein each bus participant includes a lookup table for encoding each transmission state into a corresponding termination impedance value.

2. The system of claim 1, wherein each participant can communicate with each other participant via the bus.

3. The system of claim 1, wherein each of the bus participants comprises a slave device that is in communication with a master device via the bus.

4. The system of claim 3, wherein the system further comprises the master device.

5. The system of claim 1, wherein each of the bus participants comprises a memory device.

6. The system of claim 1, wherein each bus participant determines the transmission state by decoding a bus control protocol, the bus control protocol coordinating communication between the bus participants.

7. The system of claim 1, further comprising a transmission control bus for carrying information about the transmission state, each bus participant being coupled to the transmission control bus.

8. The system of claim 7, further comprising a command/control bus for carrying signals to coordinate communication between the bus participants.

9. The system of claim 8, wherein the transmission control bus comprises an idle bit and a binary coded address for a communication source and/or a communication destination.

10. The system of claim 8, wherein each of the bus participants comprises a slave device coupled to a master device through the bus, the transmission control bus comprising an idle bit, a direction bit and a binary coded address of the slave device communicating on the bus, the direction bit indicating whether bus information is being transmitted to the slave device or from the slave device.

11. The system of claim 1, wherein each lookup table is programmed independently in each bus participant.

12. The system of claim 1, wherein each bus participant comprises an integrated circuit chip and wherein each bus participant includes the lookup table formed on the integrated circuit chip.

13. The system of claim 12, wherein the lookup table comprises a volatile memory.

14. The system of claim 12, wherein the lookup table comprises a one-time programmable memory.

15. The system of claim 1, wherein each bus participant includes a plurality of lookup tables, wherein one of the lookup tables is used for encoding each transmission state into a corresponding termination impedance value.

16. The system of claim 1, wherein each bus participant encodes each transmission state into a corresponding termination impedance value using a mathematical function and/or logic.

17. An electronic system comprising
an information source/destination;
a bus coupled to the information source/destination;
a first integrated circuit having an input/output node coupled to the bus, the input/output node having a programmable termination resistance; and
a second integrated circuit having an input/output node coupled to the bus, the input/output node having a programmable termination resistance;
wherein the programmable termination resistance of the first integrated circuit has a first resistance when information is communicated from the information source/destination to the first integrated circuit via the bus, a second resistance when information is communicated from the information source/destination to the second integrated circuit via the bus, and a third resistance when information is communicated from the second integrated circuit to the information source/destination via the bus, wherein the programmable termination resistance of the first integrated circuit depends on a position of the first integrated circuit on the bus; and
wherein the programmable termination resistance of the second integrated circuit has a fourth resistance when information is communicated from the information source/destination to the first integrated circuit via the bus, a fifth resistance when information is communicated from the information source/destination to the second integrated circuit via the bus, and a sixth resistance when information is communicated from the first integrated circuit to the information source/destination via the bus, wherein the programmable termination resistance of the second integrated circuit depends on a position of the second integrated circuit on the bus, the position of the second integrated circuit being different than the position of the first integrated circuit, wherein one or more of the first, second, third, fourth, fifth, and sixth impedances are of different impedance values.

18. The system of claim 17, wherein the programmable termination resistance of the second integrated circuit has the fourth resistance when information is communicated from the bus to the first integrated circuit, the fifth resistance when information is communicated from the bus to the second integrated circuit, and the sixth resistance when information is communicated from the first integrated circuit to the bus.

19. The system of claim 18, further comprising a control signal line coupled to the first integrated circuit and the second integrated circuit, wherein the control signal line carries information to program the programmable termination resistances.

20. The system of claim 18, wherein the first integrated circuit includes a lookup table that stores values related to the first, second, and third resistances and the second integrated circuit includes a look up table that stores values related to the fourth, fifth, and sixth resistances.

21. The system of claim 20, further comprising a control signal line coupled to the first integrated circuit, wherein the first integrated circuit determines the programmable termination resistance based upon information carried on the control signal line.

22. The system of claim 17, wherein the information source/destination comprises an integrated circuit.

23. The system of claim 17, further comprising a printed circuit board, wherein the bus, the first integrated circuit and the second integrated circuit are attached to the printed circuit board.

24. The system of claim 23, wherein the information source/destination comprises a connector on the printed circuit board.

25. An electronic system comprising:
a plurality of bus participants;
a data bus coupled to each of the bus participants;
a control bus coupled to each of the bus participants, wherein ones of the bus participants communicate data via the data bus in a finite number of transmission states as determined by information carried on the control bus, wherein the control bus provides all control information needed by the ones of the bus participants in order to communicate data; and
a transmission control bus coupled to each of the bus participants, the transmission control bus carrying information related to which transmission state of the finite number of transmission states is being used.

26. The system of claim 25, wherein the transmission control bus comprises an idle bit and a binary coded address for a communication source and/or a communication destination.

27. The system of claim 25, wherein each of the bus participants comprises a slave device coupled to a master device through the data bus and the control bus.

28. The system of claim 27, wherein the transmission control bus comprises an idle bit, a direction bit and a binary coded address of the slave device communicating on the data bus.

29. The system of claim 25, wherein each bus participant comprises a memory device.

30. The system of claim 29, further comprising a controller coupled to the data bus and the control bus.

31. The system of claim 25, wherein the control bus further comprises a command bus.

32. The system of claim 31, wherein the control bus comprises a control bus that comprises an address bus, a control bus and a command bus.

33. A memory module comprising:
a circuit board;
a data bus on the circuit board; and
a plurality of memory chips of a first rank on the circuit board, each of the memory chips having a plurality of data input/output nodes coupled in parallel to the data bus, each data input/output node being coupled to a programmable termination resistance;
wherein the resistance for each the programmable termination resistances is determined independently for each memory chip of the first rank and wherein the resistance of each programmable termination resistance is determined based on a transaction type and which of the memory chips is communicating with the data bus,
whereby the resistance of each termination resistance is different based on the transaction type.

34. The memory module of claim 33, wherein the memory module comprises a DIMM.

35. The memory module of claim 33, further comprising a transmission control bus on the circuit board, wherein the resistance for each the programmable termination resistances is determined based upon information received from the transmission control bus.

36. The memory module of claim 35, wherein the transmission control bus provides a code that can be used to access an entry from a look up table within each memory chip, the resistance for each of the programmable termination resistances being determined from the accessed look up table entry.

37. The memory module of claim 33, wherein each of the memory chips comprises a dynamic random access memory chip.

38. The memory module of claim 37, further comprising a clock line on the circuit board, the clock line coupled to each of the memory chips such that the memory chips operate as double data rate devices.

39. The memory module of claim 33, wherein each memory chip includes a lookup table for storing information related to each of the programmable termination resistances.

40. The memory module of claim 33, wherein the plurality of memory chips comprises four dynamic random access memory chips coupled in parallel to the data bus.

41. The memory module of claim 40, wherein the plurality of memory chips are arranged in four ranks, the first rank being one of the four ranks, and wherein, for any clock cycle, the programmable termination resistance for each memory chip is selected from one of nine values, the nine values comprising:
a first value when the data bus is in an idle state;
a second value when a first chip is performing a read transaction;
a third value when the first chip is performing a write transaction;
a fourth value when a second chip is performing a read transaction;
a fifth value when the second chip is performing a write transaction;

a sixth value when a third chip is performing a read transaction;

a seventh value when the third chip is performing a write transaction;

an eighth value when a fourth chip is performing a read transaction; and a ninth value when the fourth chip is performing a write transaction.

42. The memory module of claim 41, further comprising a four-bit transmission control bus on the circuit board, wherein the resistance for each of the programmable termination resistances is determined based upon information received from the transmission control bus.

43. A memory device comprising:
an array of memory cells;
a data input/output coupled to the array of memory cells;
a bus state determination unit;
a termination resistance mapping circuit to determine a termination resistance based, at least in part, on bus state information received from the bus state determination unit; and
a programmable termination resistor coupled to the data input/output, wherein the programmable termination resistor is set to the termination resistance determined by the termination resistance mapping circuit;
wherein bus state determination unit provides information on whether a bus coupled to the data input/output is idle, information on whether a transaction on the bus is a read or a write;
and information regarding an address of a device being accessed on the bus; and
wherein the bus state determination unit is coupled to a termination control input that comprises a first input terminal for providing information on whether a bus coupled to the data input/output is idle; a second input providing information on whether a transaction on the bus is a read or a write; and third and fourth inputs providing information regarding an address of a device being accessed on the bus.

44. The device of claim 43, wherein the resistance mapping circuit includes a lookup table that stores at least four values, wherein termination resistance is determined from one of the at least four values.

45. The device of claim 44, further comprising:
a plurality of address inputs; and
a plurality of control inputs, wherein data is read from or written to the array based on a command received at the control inputs
wherein, when the command indicates an access to a first other memory device, the programmable termination resistor is set to a first termination resistance based on a first value stored in the look-up table; and
wherein, when the command indicates an access to a second other memory device, the programmable termination resistor is set to a second termination resistance based on a second value stored in the look-up table, the second value stored in a different location of the look-up table than the first value.

46. The device of claim 43, wherein the termination control input comprises five input terminals.

47. The device of claim 43, wherein the memory cells comprise dynamic random access memory cells.

48. The device of claim 47, wherein the memory device comprises a double-data rate synchronous dynamic random access memory device.

49. A memory device comprising:
an array of memory cells;
a data input/output coupled to the array of memory cells, the data input/output for being coupled to a data bus that is coupled to a plurality of other memory devices;
a programmable termination resistor coupled to the data input/output;
means for snooping a transmission state from all possible transmission states of the data bus; and
means for causing the programmable termination resistor to be set to a termination resistance for each transmission state on the data bus, the termination resistance being determined by which transmission state is detected.

50. The device of claim 49, wherein the means for causing includes a look up table.

51. The device of claim 49, wherein the means for causing includes an on-die termination bus input.

52. The device of claim 49, wherein the means for causing includes a command bus decoder.

53. A method of communicating with a plurality of integrated circuits coupled to a bus, each of the integrated circuits having an input/output node coupled to the bus, the input/output node having a programmable termination resistor, the method comprising:
accessing the input/output node of one of the integrated circuits via the bus; and
causing the programmable termination resistor of each of the integrated circuits to be independently set to a termination resistance, the termination resistance being determined by a transmission state and a position of the integrated circuit on the bus,
wherein one or more of the programmable termination resistors are of different resistance values.

54. The method of claim 53, wherein the transaction type comprises either a read or a write.

55. The method of claim 53, further comprising causing the programmable termination resistor of each of the integrated circuits to be set to an idle-state termination resistance during a time when the bus is idle.

56. The method of claim 53, further comprising providing information to each integrated circuit, the information relating to the transaction type and to which of the plurality of integrated circuits is being accessed.

57. The method of claim 56, wherein the information is provided by a transmission control bus.

58. The method of claim 57, wherein the transmission control bus provides information on whether a bus coupled to the data input/output is idle, information on whether a transaction on the bus is a read or a write; and information regarding an address of an integrated circuit being accessed on the bus.

59. The method of claim 58, wherein the transmission control bus comprises exactly four bus lines.

60. The method of claim 59, wherein the information is provided by an address/control bus.

61. The method of claim 56, wherein each of the integrated circuits comprises a memory chip.

62. The method of claim 61, wherein each of the integrated circuits comprises a dynamic random access memory device.

63. A method of operating a memory system that includes a first memory chip and a second memory chip, each coupled to a data bus at a data input/output node, the method comprising:
writing data from the data bus to the first memory chip, wherein the data input/output node of the first memory chip is terminated with a first resistance and the data input/output node of the second memory chip is terminated with a second resistance;

writing data from the data bus to the second memory chip, wherein the data input/output node of the first memory chip is terminated with a third resistance and the data input/output node of the second memory chip is terminated with a fourth resistance;

reading data from the first memory chip to the data bus, wherein the data input/output node of the second memory chip is terminated with a fifth resistance; and reading data from the second memory chip to the data bus, wherein the data input/output node of the first memory chip is terminated with a sixth resistance;

wherein the first, second, third, fourth, fifth, and sixth resistances are determined independently depending on a position of the memory chip on the bus, wherein one or more of the first, second, third, fourth, fifth, and sixth impedance are of different impedance values.

64. The method of claim 63, further comprising terminating the data input/output node of the first memory chip with a seventh resistance and the data input/output node of the second memory chip with an eighth resistance during a mode where the data bus is idle.

65. The method of claim 63, wherein the first and second memory chips comprise double data rate synchronous dynamic random access memory chips.

66. A computer system comprising:

a microprocessor;

a plurality of input/output devices responsive to the microprocessor;

a memory controller coupled to the microprocessor; and a memory module coupled to the memory controller, the memory module comprising a plurality of memory chips coupled to a data bus, wherein the data bus carries information related to all possible transmission states of the data bus, each of the memory chips having a plurality of data input/output nodes coupled to the data bus, each data input/output node being coupled to a programmable termination resistance, wherein the resistance for each of the programmable termination resistances is determined independently for each memory chip and wherein the resistance of each programmable termination resistance is determined based on a transmission state comprising a transaction type and which of the memory chips is communicating with the data bus or whether or not the data bus is idle, wherein one or more of the programmable termination resistors are of different resistance values.

* * * * *